United States Patent

Bargauan

[11] Patent Number: 5,875,005
[45] Date of Patent: Feb. 23, 1999

[54] METHOD FOR GENERATING A MODULATED TELEVISION SIGNAL

[75] Inventor: Michele Bargauan, Milan, Italy

[73] Assignee: M.B. International S.r.l., Livigno, Italy

[21] Appl. No.: 613,810

[22] Filed: Mar. 6, 1996

[30] Foreign Application Priority Data

Mar. 10, 1995 [IT] Italy .................................. MI95A0475

[51] Int. Cl.⁶ .................................................. H04N 5/40
[52] U.S. Cl. ..................... 348/724; 348/475; 332/151; 375/298; 455/47; 455/102
[58] Field of Search .................... 375/295, 296, 375/298, 300, 308; 332/103, 108, 149, 151; 455/47, 48, 102, 108, 109; 348/723, 724, 423, 426, 473, 475, 388, 607, 608, 609, 610, 611, 613; H04N 5/21, 5/40

[56] References Cited

U.S. PATENT DOCUMENTS

| | | | |
|---|---|---|---|
| 4,882,614 | 11/1989 | Kageyama et al. | 358/141 |
| 4,882,725 | 11/1989 | Noda et al. | 358/143 |
| 4,918,515 | 4/1990 | Faroudja | 358/167 |
| 5,122,879 | 6/1992 | Ito | 358/191.1 |
| 5,243,304 | 9/1993 | Rixon | 455/109 |
| 5,534,933 | 7/1996 | Yang | 348/475 |

Primary Examiner—Michael Lee
Assistant Examiner—Jeffrey S. Murrell
Attorney, Agent, or Firm—Guido Modiano; Albert Josif

[57] ABSTRACT

The method for generating a modulated television signal involves performing a first filtering and a second filtering to obtain two signals, one having a passband that is equal to complete passband and the other one having a passband that is equal to the sideband to be suppressed. The signal having a complete passband is amplitude-modulated with a video carrier, obtaining a first signal. The signal having a passband equal to the sideband to be suppressed is then divided into a first component and a second component, and the first component is phase-shifting by 90° with respect to the second component. The first component is modulated with a video carrier that is phase shifted by 90°, obtaining a second signal. The second component of the signal having a passband equal to the sideband to be suppressed is modulated with the video carrier, obtaining a third signal. The second and third signals are then subjected to an algebraic sum, obtaining a fourth signal. The fourth signal is then subtracted from the first signal, obtaining a fifth signal that represents the television signal having the desired sideband.

8 Claims, 3 Drawing Sheets and an analog signal to generate the final

METHOD FOR GENERATING A MODULATED TELEVISION SIGNAL

BACKGROUND OF THE INVENTION

The present invention relates to a method for generating a modulated television signal with improved characteristics.

The television transmission mode that uses two carriers, one for audio and one for video, is known in the art.

As regards the video part, the video signal modulates a video carrier with positive or negative modulation and is then shaped with a partially suppressed sideband. This type of modulation is termed vestigial modulation (VSB—Vestigial Sideband), and with respect to conventional amplitude modulation it has the advantages of reducing the occupied band without appreciably degrading picture quality, requiring less power to transmit the information, in addition to a good response to low frequencies.

For the audio part, the audio signal frequency modulates the carrier.

In old transmitters, modulation was performed by amplifying the carrier to the maximum power level and then modulating it. Filtering was performed at high power with the use of very expensive and bulky power filters that were highly unstable and therefore required periodic adjustments and were highly temperature-sensitive, requiring special conditioning systems.

Currently, the video part of the signal is generated with analog methods. The video carrier is modulated, at an intermediate frequency (IF), by the video signal, generating a signal with two sidebands, and is then filtered in order to obtain the desired shaping of the sidebands. Filtering is achieved with analog filters of the SAW (Surface Acoustic Wave) type, which must be produced differently according to the television standard that is used. A drawback of this solution is the fact that the generated television signal has limited characteristics in terms of quality, linearity, flexibility, and stability, which are a consequence of the analog-type processing to which it has been subjected. Another drawback of this solution is the fact that it requires many level adjustments for white, black, sync signals, and other parameters that are necessary for linear power amplification. Furthermore, analog generation of the video signal has the drawback that if one wishes to transmit a digital signal, which is the future of television development, it requires a subsequent conversion from analog to digital, with further adjustments. Finally, the generated television signal does not have particularly good characteristics in terms of quality, linearity, and stability.

SUMMARY OF THE INVENTION

The aim of the present invention is therefore to provide a method for generating a modulated television signal with improved characteristics in terms of quality, linearity, flexibility, and stability.

Within the scope of this aim, an object of the present invention is to provide a method for generating a television signal that uses fully-digital processing to generate the final video signal.

Another object of the present invention is to provide a method for generating a television signal that can be adapted with simple modifications to all television standards.

Another object of the invention is to provide a method for generating a television signal that has characteristics of absolute linearity and mathematical precision.

Another object of the present invention is to provide a method for generating a television signal that uses processing that is mixed, i.e., partially digital and partially analog.

Another object of the present invention is to provide a method for generating a television signal that is highly reliable and relatively easy to provide at competitive costs.

With this aim, these objects, and other objects which will become apparent hereinafter, in view, there is provided a method for generating a television signal, characterized in that it comprises the steps that consist in:

performing a first filtering and a second filtering of a video signal to obtain two signals, one having a passband that is equal to the sideband to be suppressed and the other one having a complete passband;

amplitude-modulating said signal having a complete passband with a video carrier, obtaining a first signal;

dividing said signal having a passband equal to the sideband to be suppressed into a first component and a second component and phase-shifting by 90° said first component with respect to said second component;

modulating said first component, phase-shifted by 90° with respect to said second component, of said signal having a passband equal to the sideband to be suppressed, with a video carrier that is phase-shifted by 90°, obtaining a second signal;

modulating said second component of said signal having a passband equal to the sideband to be suppressed with the video carrier, obtaining a third signal;

performing the algebraic sum of said second and third signals, obtaining a fourth signal;

subtracting said fourth signal from said first signal, obtaining a fifth signal that represents the television signal having the desired sideband.

BRIEF DESCRIPTION OF THE DRAWINGS

Further characteristics and advantages of the invention will become apparent from the description of a preferred but not exclusive embodiment of a method according to the invention, illustrated only by way of non-limitative example in the accompanying drawings, wherein.

DESCRIPTION OF THE PREFERRED EMBODIMENTS

Figure 1:
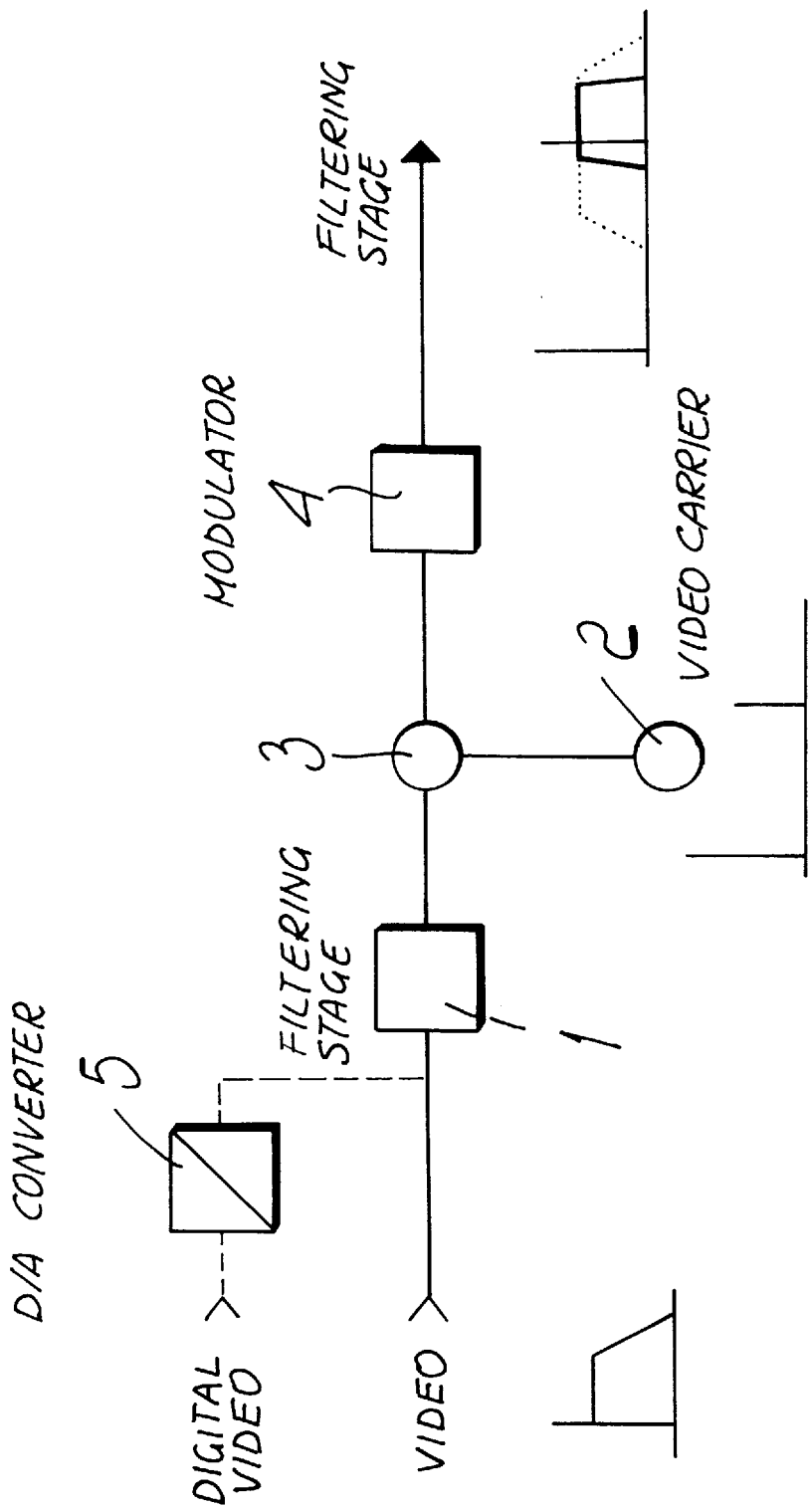
FIG. 1 is a block diagram of the steps of the method for generating a television signal according to the prior art.

FIG. 1 shows, in the form of a block diagram, the method for generating a television signal according to the prior art, which comprises the steps that consist in modulating (step 3) with a modulator 3 the video carrier 2 with an analog signal, which is filtered (step 1) in a filter. The modulated video carrier 2 is then filtered (step 4) in a VSB (Vestigial Sideband) filter to obtain in output the adequate shaping of the sidebands. If one uses a digital video signal, it is necessary to convert it (step 5) into an analog signal by means of a D/A converter before filtering it (step 1) in the filter.

Figure 2:
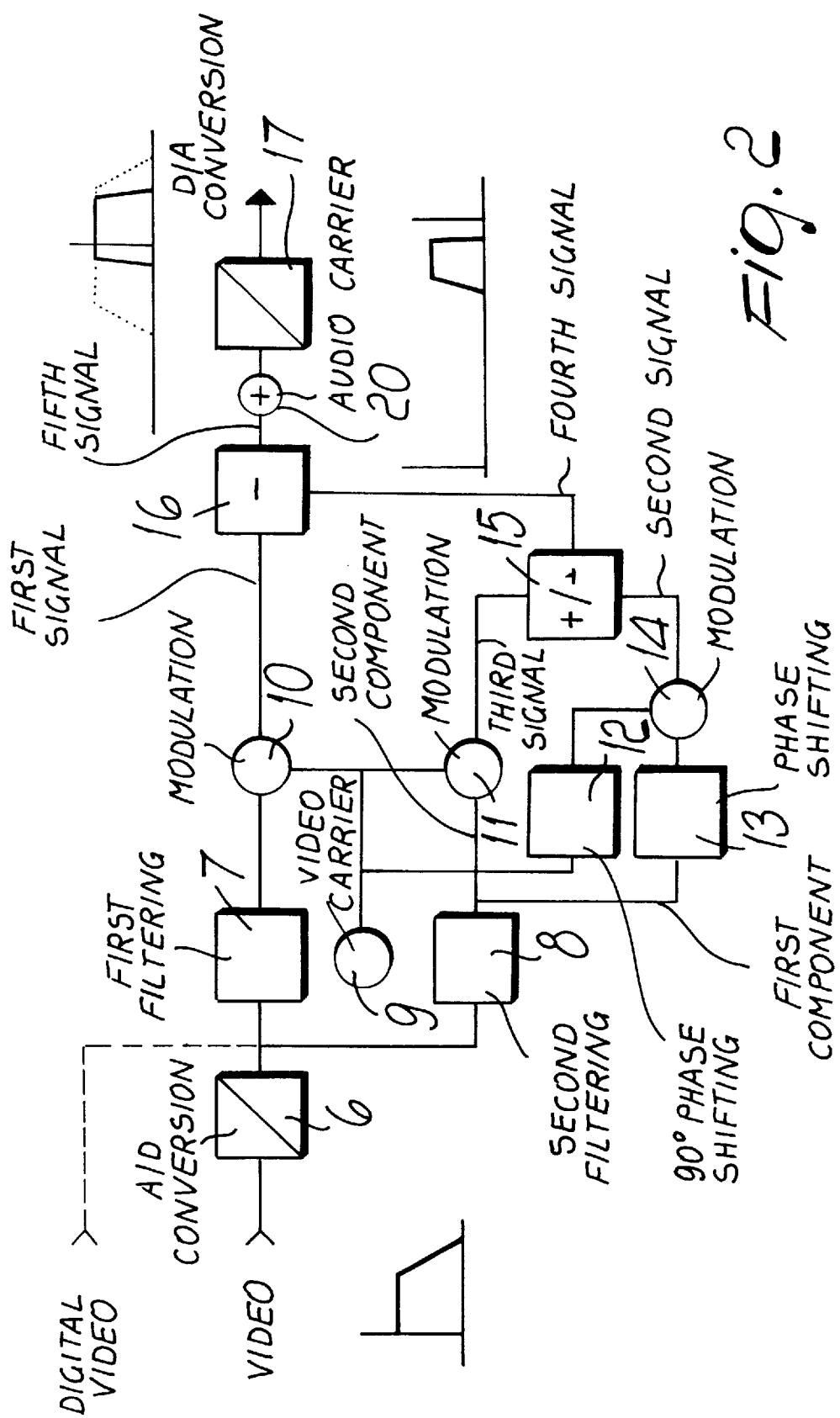
FIG. 2 is a block diagram of the steps of a first embodiment of the method for generating a television signal according to the present invention.

FIG. 2 is a block diagram of the steps of a first embodiment of the method according to the invention.

The method starts with the conversion into digital form (step 6) of the analog video signal in an A/D converter. Of course, if a digital video signal is used directly, this conversion step is not performed.

Then a first filtering and a second filtering (steps 7 and 8) of the video signal are performed to obtain two signals, one in which the passband is equal to the complete sideband and one in which the passband is equal to the sideband to be suppressed.

The signal whose passband is equal to the complete sideband is amplitude-modulated (step 10) numerically with the video carrier 9 in a dual-band modulator, obtaining a first signal.

The signal whose passband is equal to the sideband to be suppressed is instead divided into a first component and a second component; the first component is phase-shifted by 90° with respect to the second component. The phase shifting occurs in step 13. The first and second components are then modulated in pairs, respectively with the video carrier 9 phase-shifted by 90°, obtaining a second signal, and with the straight video carrier 9, obtaining a third signal.

The phase shifting of the video carrier occurs in step 12. The modulation of the first component with the video carrier 9 phase-shifted by 90° occurs in step 14 (by means of a modulator), whereas the modulation of the second component with the straight video carrier 9 occurs in step 11 (by means of another modulator).

The signals produced by these two paired modulations are subtracted or added (step 15), depending on whether one wishes to suppress the upper sideband or the lower one, obtaining a fourth signal.

The fourth signal, which contains the unwanted sidebands and is obtained in step 15, is subtracted from the first signal (step 16) that is the result of the modulation with two sidebands, obtaining a fifth signal with the desired sideband suppression.

The fifth signal is then added to the audio carrier (step 20) and converted from digital to analog, step 17.

Of course, if a digital television signal is transmitted, this digital-to-analog conversion step is not performed.

In mathematical terms, given:

$f_{max}$: highest frequency of the video signal
$f_{sb}$: maximum frequency of the suppressed sideband $$c(t) = \cos(\omega_p t) \qquad = \text{video carrier}$$

$$s(t) = \sum_{k=0}^{f_{MAX}} s_k \cos(\omega_k t + \phi_k) \qquad = \text{the video signal}$$

By filtering (steps 7 and 8):

$$s_{filtered}(t) = \sum_{k=f_{SB}}^{f_{MAX}} s_k \cos(\omega_k t - \phi_k)$$

is obtained.

Phase-shifting by 90° (step 13), obtains:

$$s^{90}_{filtered}(t) = \sum_{k=f_{SB}}^{f_{MAX}} s_k \sin(\omega_k t - \phi_k)$$

and phase-shifting the video carrier c(t) (step 12), obtains:

$$c^{90}(t) = \sin(\omega t)$$

and modulating in pairs, obtains:

$$m_1(t) = c(t) * s_{filtered}(t) = \cos(\omega_p t) * \sum_{k=f_{SB}}^{f_{MAX}} s_k \cos(\omega_k t - \phi_k); \quad \text{(step 11)}$$

$$m_2(t) = c^{90}(t) * s^{90}_{filtered}(t) = \sin(\omega_p t) * \sum_{k=f_{SB}}^{f_{MAX}} s_k \sin(\omega_k t - \phi_k); \quad \text{(step 14)}$$

by adding (step 15), one obtains:

$$m_{SB}(t) = m_1(t) + m_2(t) = \sum_{k=f_{SB}}^{f_{MAX}} s_k \cos((\omega_p + \omega_k)t - \phi_k)$$

In this way, the upper sideband is obtained; the lower sideband is instead obtained by subtracting.

$$m_0(t) = c(t) * s(t) \quad \text{(step 10)}$$

$$tv_{OUT} = m_0 - m_{SB} =$$

$$\sum_{k=0}^{f_{SB}} s_k(\cos((\omega_p + \omega_k)t - \phi_k) + \cos((\omega_p - \omega_k)t - \phi_k)) +$$

$$\sum_{k=f_{SB}}^{f_{MAX}} s_k \cos((\omega_p + \omega_k)t - \phi_k)$$

The modulated television signal is thus obtained in output.

Figure 3:
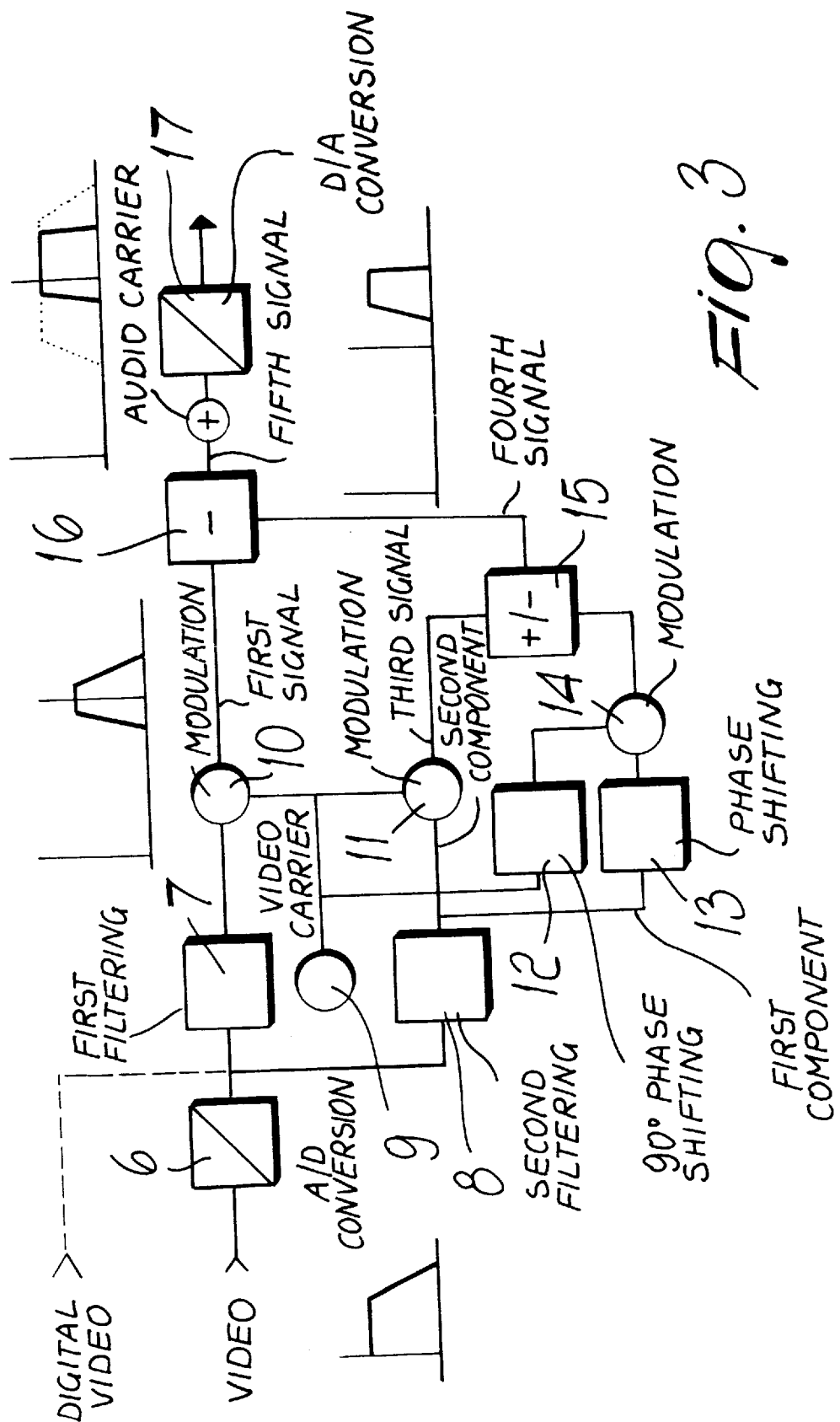
FIG. 3 is a block diagram of a second embodiment of the method for generating a television signal according to the invention.

A second embodiment of the method for generating a television signal according to the invention is shown in FIG. 3. This second embodiment of the above method consists in performing the filtering step 7 differently, so as to obtain a first signal having two sidebands for the frequencies $0-f_{sb}$. In the filtering step 7 explained above, one instead obtained a first signal with a sideband $0-f_{max}$.

After step 7, in this case in step 16 the fourth signal is added to the sideband $f_{sb}-f_{max}$ that is normally derived from step 15, instead of subtracting it as occurred in step 16 of the first embodiment. The television signal having the desired sideband is thus obtained in output.

In practice it has been observed that the method according to the invention fully achieves the intended aim, since it allows to obtain, by means of a fully digital processing of the video signal, a television signal that has improved characteristics. In particular, the fully digital processing of the video signal allows to achieve absolute linearity and mathematical precision of the signal, as well as the possibility of complying with any television standard by means of simple software modifications. The signal/noise ratio is considerably better than the one obtained with analog processing methods. Furthermore, the use of digital filtering allows to filter the signal band exactly at the desired point with mathematical precision. The reconstruction of the signal, performed by adding or subtracting the sideband, depending on the embodiments, is also performed with mathematical precision without band overlap or loss errors.

The method thus conceived is susceptible to numerous modifications and variations, all of which are within the scope of the inventive concept; all the details may furthermore be replaced with other technically equivalent elements.

A variation, both for the first embodiment and for the second embodiment of the method for generating a television signal, is represented by a hybrid solution that is partially digital and partially analog. This variation has been studied to improve existing transmitters that use direct modulation. In this variation, the first, second, and third signals ($m_0(t)$, $m_2(t)$, and $m_1(t)$) of the two above described embodiments are converted from analog to digital and modulate two carriers that are phase-shifted by 90°.

The resulting signals are then added with a directional coupler; the value of this coupler can vary according to the available power levels; advantageously, the most appropriate value according to tests seems to be −10 dB.

The power of the signal decreases by a small amount, whereas the power of the sidebands is higher than nominal to compensate for the losses of the directional coupler. The efficiency of the adder circuit is 90% (for a coupler at −10 dB) for the main signal: this value is very close to the value of conventional filters but without the same drawbacks.

The power required by the signal having sidebands is −9 dB relative to the nominal output power level, and this leads to much lower costs for additional circuits than those of conventional filters.

In practice, the materials employed, so long as they are compatible with the specific use, as well as the dimensions, may be any according to the requirements and the state of the art.

What is claimed is:

1. A method for generating a modulated television signal, comprising the steps that consist in:

performing a first filtering and a second filtering of a video signal to obtain two signals, one having a passband that is equal to a sideband to be suppressed and the other one having a complete passband;

amplitude-modulating said signal having a complete passband with a video carrier, obtaining a first signal;

dividing said signal having a passband equal to the sideband to be suppressed into a first component and a second component and phase-shifting by 90° said first component with respect to said second component;

modulating said first component, phase-shifted by 90° with respect to said second component, of said signal having a passband equal to the sideband to be suppressed, with a video carrier that is phase-shifted by 90°, obtaining a second signal;

modulating said second component of said signal having a passband equal to the sideband to be suppressed with the video carrier, obtaining a third signal;

performing the algebraic sum of said second and third signals, obtaining a fourth signal;

subtracting said fourth signal from said first signal, obtaining a fifth signal that represents the television signal having a desired sideband.

2. The method according to claim 1, comprising the step that consists in adding said fifth signal to an audio carrier, obtaining in output a complete television signal.

3. Method according to claim 2, wherein said fifth signal is obtained by adding said first signal having two sidebands to said fourth signal.

4. The method according to claim 2, further comprising the step of converting from digital to analog a combination of said fifth signal with the audio carrier.

5. Method according to claim 1, wherein said algebraic sum of said second and third signals is an addition to obtain the upper sideband.

6. Method according to claim 1, wherein said algebraic sum of said second and third signals is a subtraction to obtain the lower sideband.

7. The method according to claim 1, further comprising an analog-to-digital conversion, said analog-to-digital conversion being performed prior to said first and second filtering.

8. Method according to claim 1, wherein said first signal obtained from said first filtering is a signal having two sidebands.

* * * * *